United States Patent
Zhu et al.

(10) Patent No.: US 9,730,120 B2
(45) Date of Patent: Aug. 8, 2017

(54) HANDOVER USING GROUP EVOLVED PACKET SYSTEM (EPS) BEARERS

(71) Applicant: INTEL CORPORATION, Santa Clara, CA (US)

(72) Inventors: Jing Zhu, Portland, OR (US); Maruti Gupta, Portland, OR (US); Rath Vannithamby, Portland, OR (US); Mohammad Mamunur Rashid, Hillsboro, OR (US); Kathiravetpillai Sivanesan, Richardson, TX (US); Satish C. Jha, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 91 days.

(21) Appl. No.: 14/727,678

(22) Filed: Jun. 1, 2015

(65) Prior Publication Data
US 2016/0353337 A1 Dec. 1, 2016

(51) Int. Cl.
*H04W 36/00* (2009.01)
*H04W 4/08* (2009.01)
*H04W 36/32* (2009.01)

(52) U.S. Cl.
CPC ......... *H04W 36/0055* (2013.01); *H04W 4/08* (2013.01); *H04W 36/0083* (2013.01); *H04W 36/32* (2013.01)

(58) Field of Classification Search
None
See application file for complete search history.

(56) References Cited

U.S. PATENT DOCUMENTS

| | | | |
|---|---|---|---|
| 2012/0302240 A1 | 11/2012 | Tamaki et al. | |
| 2013/0039343 A1* | 2/2013 | Hori | H04W 36/12 370/331 |
| 2013/0308527 A1* | 11/2013 | Chin | H04W 36/0022 370/328 |
| 2013/0322325 A1 | 12/2013 | Hahn et al. | |
| 2014/0010192 A1* | 1/2014 | Chang | H04L 5/001 370/329 |

(Continued)

FOREIGN PATENT DOCUMENTS

| | | |
|---|---|---|
| EP | 2 876 932 A1 | 5/2015 |
| WO | WO 2012/060924 A2 | 5/2012 |

(Continued)

*Primary Examiner* — Chi H Pham
*Assistant Examiner* — Soon-Dong D Hyun
(74) *Attorney, Agent, or Firm* — Thorpe North & Western

(57) ABSTRACT

Technology for a target evolved node B (eNB) operable to facilitate handover is disclosed. The target eNB can receive a handover request message to hand over a user equipment (UE) from the source eNB to the target eNB. The handover request message can include an evolved packet system (EPS) bearer group identifier (ID) indicating an EPS group bearer of the source eNB and associated with the UE, a last UE indicator to indicate whether the UE is a last UE of the source eNB to use the EPS group bearer, and a downlink (DL) traffic indicator to indicate whether the DL traffic for the UE during handover is negligible. The target eNB can perform a handover procedure to establish a connection with the UE based on at least one of the EPS bearer group ID, the last UE indicator, or the DL traffic indicator included in the handover request message.

21 Claims, 7 Drawing Sheets

(56) References Cited

U.S. PATENT DOCUMENTS

| | | | | |
|---|---|---|---|---|
| 2014/0286223 A1* | 9/2014 | Yu | .......................... | H04W 4/08 |
| | | | | 370/312 |
| 2015/0029999 A1* | 1/2015 | Horn | .................... | H04W 36/22 |
| | | | | 370/331 |
| 2015/0229677 A1* | 8/2015 | Gu | ....................... | H04L 65/103 |
| | | | | 709/219 |
| 2016/0021592 A1* | 1/2016 | Vesely | ............. | H04W 36/0072 |
| | | | | 370/331 |

FOREIGN PATENT DOCUMENTS

| | | |
|---|---|---|
| WO | WO 2014/019739 A1 | 2/2014 |
| WO | WO 2014/021758 A1 | 2/2014 |

\* cited by examiner

HANDOVER USING GROUP EVOLVED PACKET SYSTEM (EPS) BEARERS

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

In homogeneous networks, the node, also called a macro node, can provide basic wireless coverage to wireless devices in a cell. The cell can be the area in which the wireless devices are operable to communicate with the macro node. Heterogeneous networks (HetNets) can be used to handle the increased traffic loads on the macro nodes due to increased usage and functionality of wireless devices. HetNets can include a layer of planned high power macro nodes (or macro-eNBs) overlaid with layers of lower power nodes (small-eNBs, micro-eNBs, pico-eNBs, femto-eNBs, or home eNBs [HeNBs]) that can be deployed in a less well planned or even entirely uncoordinated manner within the coverage area (cell) of a macro node. The lower power nodes (LPNs) can generally be referred to as "low power nodes", small nodes, or small cells.

In LTE, data can be transmitted from the eNodeB to the UE via a physical downlink shared channel (PDSCH). A physical uplink control channel (PUCCH) can be used to acknowledge that data was received. Downlink and uplink channels or transmissions can use time-division duplexing (TDD) or frequency-division duplexing (FDD).

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
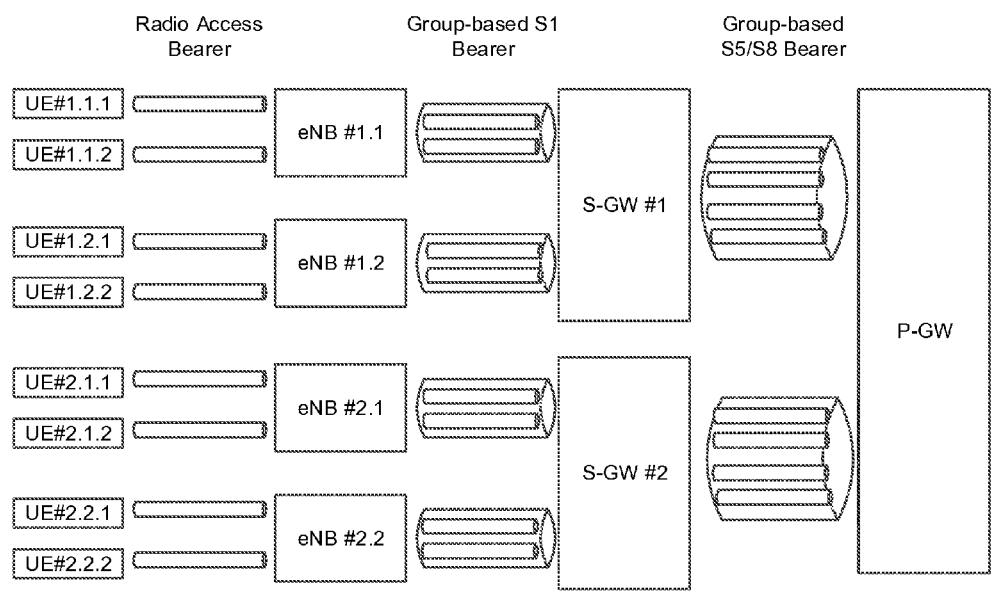
FIG. 1 illustrates a group based evolved packet system (EPS) bearer architecture in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

A technology is described for supporting user equipment (UE) mobility management and handover with Evolved Packet System (EPS) bearer groupings. During a handover procedure, a source evolved node B (eNB) can hand over the UE to a target eNB. For example, the source eNB can send a handover request message to the target eNB for handing over the UE to the target eNB. The handover request message can include an EPS bearer group identifier (ID) indicating an EPS group bearer associated with the UE. The EPS group bearer can be associated with a group of UEs, which includes the UE being handed over from the source eNB to the target eNB. The EPS group bearer can include a group-based S1 or S5/S8 bearer. The handover request message can include a last UE indicator that indicates whether the UE is a last UE of the source eNB to use the EPS group bearer. The handover request message can include a downlink (DL) traffic indicator indicating whether DL traffic for the EPS group bearer is negligible or not negligible. In one example, the DL traffic can be negligible or not based on the UE's subscription information.

In one configuration, the target eNB can determine that the EPS group bearer associated with the UE is already established at the target eNB. Therefore, the target eNB can skip a bearer establishment procedure for establishing the EPS group bearer during the handover procedure. In other words, the EPS group bearer does not have to be reestablished at the target eNB for the UE since the EPS group bearer is already established at the target eNB for other UEs in the same EPS bearer group, thereby reducing an amount of signaling during the handover procedure.

In one example, the target eNB can receive the handover request message from the source eNB during the handover procedure, wherein the handover request message includes the EPS bearer group ID, the last UE indicator, and the DL traffic indicator. If the last UE indicator indicates that the UE is not the last UE of the source eNB to use the EPS group bearer (e.g., UE Last Indicator=0) and the DL traffic indicator indicates that the DL traffic for the EPS group bearer of the UE is negligible during handover (e.g., DL Traffic Indicator=0), then the handover procedure may not include transmission of a path switch request message from the target eNB to a mobility management entity (MME), a modify bearer request message from the MME to a serving gateway (SGW), a modify bearer response message from the SGW to the MME, and a path switch request acknowledgement message from the MME to the target eNB. In addition, the handover procedure may not include removal, at the SGW, of an S1 group bearer with the source eNB and switching a DL path for the UE's traffic when the UE is not the last UE and the DL traffic is negligible. In one example, steps 12 through 16 of the handover procedure can be skipped to minimize core network signaling overhead when the UE is not the last UE of the EPS bearer group of the source eNB and its DL traffic is negligible.

In one example, if the last UE indicator indicates that the UE is the last UE of the source eNB to use the EPS group bearer (e.g., UE Last Indicator=1) or the DL traffic indicator indicates that the DL traffic for the EPS group bearer of the UE is not negligible during handover (e.g., DL Traffic Indicator=1), then the handover procedure may include transmission of the path switch request message from the target eNB to the MME as in the legacy system, the modify bearer request message from the MME to the SGW, a modify bearer response message from the SGW to the MME, and a path switch request acknowledgement message from the MME to the target eNB. In addition, the handover procedure may include removal, at the SGW, of the S1 group bearer with the source eNB and switching the DL path for the UE's traffic when the UE is the last UE or the DL traffic is not negligible. In one example, steps 12 through 16 of the handover procedure are performed when the UE is the last UE or DL traffic is not negligible.

Machine Type Communication (MTC) is a technology that allows wireless and wired systems to communicate with other devices without any human intervention. MTC device can include mobile devices, such as a user equipment. In addition, MTC devices can include non-mobile devices, such as sensors or meters that collect information. The MTC device can communicate via a mobile network (e.g., wireless, wired, hybrid) with an MTC application server, which can use or request data from the MTC device. The expansion of mobile networks (e.g., broadband wireless access networks, wide area networks) across the world, along with the increased speed/bandwidth and reduced power of wireless communication, has facilitated the growth of MTC. Although the amount of data sent by MTC devices is very small, a large number of these devices connected to a wireless network and used concurrently may increase a data load and overhead expense on a network.

An Evolved Packet System (EPS) network is a connection-oriented transmission network that establishes connections between various network nodes. These connections can be referred to as EPS bearers. A default EPS bearer can be established when a user equipment (UE) registers with the core network during an attach procedure. In one example, the default EPS bearer can be established for a UE that is configured for MTC. The default EPS bearer can provide always on connectivity for the UE. In addition, the EPS bearer can provide a transport service with specific quality of service (QoS) attributes. For example, the QoS parameters associated with the EPS bearer can include a channel quality indicator (CQI), allocation and retention priority (ARP), aggregate maximum bit rate (AMBR), and guaranteed bit rate (GBR).

The EPS bearer can provide connectivity between the UE (e.g., the UE configured for MTC) and a packet data network (PDN) gateway (PGW). The EPS bearer can be generated from a combination of a radio access bearer (RAB), an S1 bearer and/or an S5/S8 bearer. The RAB (e.g., a data radio bearer) can provide an over-the-air connectivity between the UE and an evolved node B (eNB). In other words, the RAB can transport packets of the EPS bearer between the UE and the eNB. The UE and the eNB can be part of the E-UTRAN. The S1 bearer can provide connectivity between the eNB and the SGW. In other words, the S1 bearer can transport the packets of the EPS bearer between the eNB and the SGW. The S5/S8 bearer can provide connectivity between the SGW and the PGW. In other words, the S5/S8 bearer can transport packets of the EPS bearer between the SGW and the PGW. The SGW and the PGW can be part of an Evolved Packet Core (EPC). The combination of the RAB and the S1 bearer can generate an E-UTRAN radio access bearer (E-RAB). Thus, the E-RAB can provide connectivity between the UE and a serving gateway (SGW).

In traditional Long Term Evolution (LTE) systems, the default EPS bearer can be established for each UE (e.g., the UE configured to MTC) that is attached or registered with the wireless network. As a result, the handling of a large number of UEs can create a relatively large signaling overhead in the core network. In addition, UEs configured for MTC can have infrequent traffic sessions, and each session can last for a very short duration. The UE configured for MTC can move into an idle mode after each short session, which can include releasing a part of the EPS bearer. For example, the UEs configured for MTC can release the E-RAB portion of the EPS bearer (i.e., the RAB and S1 portion of the EPS bearer) when the UE moves into the idle mode. In addition, the E-RAB portion of the EPS bearer can be reestablished for the UE when a new short session is started. The establishment and release of the E-RAB for each short session of MTC traffic can increase signaling overhead.

In one configuration, group EPS bearers can be used in order to reduce the signaling overhead from UEs that are communicating with the core network. For example, EPS bearers from multiple UEs (e.g., MTC devices) that are attached to the same eNB can be grouped into a single S1 or S5/S8 bearer. In other words, EPS bearers from multiple UEs can be tunneled in a single S1 or S5/S8 bearer. This configuration can reduce control signaling overhead due to S1 bearer and S5/S8 bearer establishments, as well as reduce General Packet Radio Service (GPRS) Tunneling Protocol (GTP-u) tunneling overhead by aggregating packets from multiple UEs in a single GTP-u payload.

FIG. 1 illustrates an exemplary group based evolved packet system (EPS) bearer architecture. An EPS bearer can be divided into a radio access bearer (RAB), a group-based S1 bearer, and a group-based S5/S8 bearer. All EPS bearers belonging to the same group can be delivered with a single S1 bearer and/or S5/S8 bearer, even when the EPS bearers in the same group are for different UEs. In one example, an eNB-based EPS bearer grouping policy can define that EPS bearers with a same access point name (APN) and for the UEs connected to a same eNB can be grouped over S1 and S5/S8 reference points.

As shown in FIG. 1, radio access bearers can provide connectivity between UEs and eNBs. For example, an eNB #1.1 can be connected to a UE #1.1.1 via a first radio access bearer and a UE #1.1.2 via a second radio access bearer. With respect to the eNB #1.1, the first radio access bearer and the second radio access bearer can be grouped into a first S1 bearer (i.e., a first group-based S1 bearer). Thus, the eNB #1.1 can be connected to an S-GW #1 using the first S1 bearer, wherein the first S1 bearer includes the first radio access bearer and the second radio access bearer.

Similarly, an eNB #1.2 can be connected to a UE #1.2.1 via a third radio access bearer and a UE #1.2.2 via a fourth radio access bearer. With respect to the eNB #1.2, the third radio access bearer and the fourth radio access bearer can be grouped into a second S1 bearer (i.e., a second group-based S1 bearer). Thus, the eNB #1.2 can be connected to an S-GW #2 using the second S1 bearer, wherein the second S1 bearer includes the third radio access bearer and the fourth radio access bearer.

With respect to the S-GW #1, the first S1 bearer and the second S1 bearer can be grouped into a first S5/S8 bearer (i.e., a first group-based S5/S8 bearer). Thus, the S-GW #1 can be connected to a P-GW using the first S5/S8 bearer, wherein the first S5/S8 bearer includes the first and second S1 bearer, and the first and second S1 bearer includes the four radio access bearers.

The group-based EPS bearers can allow the grouping of traffic for multiple users (or UEs) into a single connection. In other words, a group EPS bearer can be established for a group of users (or UEs), as opposed to a single user (or UE) as in previous solutions. In the present technology, the radio access bearers can be individual bearers (i.e., specific to individual UEs), but the S1 bearer and the S5/S8 bearer can be for a group of UEs. In previous solutions, individual users (or individual UEs) have their own radio access bearer, S1 bearer, and S5/S8 bearer.

In one configuration, the MME can manage grouping of the EPS bearers based on UE subscription information, the APN, and other conditions (e.g., load balancing). For example, the MME can assemble EPS bearers that meet the same grouping criteria into two groups. In one example, the MME can select a SGW and a PGW for the UE based on the UE's subscription information. If the group-based EPS bearer operation is activated, the MME can select the same SGW and the same PGW for all of the UEs in the same group.

In one configuration, the MME can initiate group based bearer establishment and release. An EPS Bearer Group ID parameter can be added to bearer context information. The EPS Bearer Group ID can uniquely identify an EPS bearer group with the same MME. The EPS Bearer Group ID can be approximately 4 bytes in size. The MME can create and manage the EPS Bearer Group ID, and then the eNB, SGW and/or PGW can map the EPS bearer corresponding to the EPS Bearer Group ID to a group-based S1 or S5/S8 bearer accordingly.

In one configuration, a group-based EPS bearer establishment procedure can be performed. The group-based EPS bearer establishment procedure can involve including bearer context information, such as the EPS Bearer Group ID, so that the SGW and the PGW can determine how to map between an EPS bearer and an EPS bearer group. In one example, the novel context information, such as the EPS Bearer Group ID, can be included in a create session request.

With respect to the group-based EPS bearer establishment procedure, a first step can involve the MME sending a create session request to the SGW. The create session request can include bearer context information, such as the EPS Bearer ID and the EPS Bearer Group ID. A second step can involve the SGW forwarding the create session request, which contains the EPS Bearer ID and the EPS Bearer Group ID, to the PGW. A third step can involve the PGW sending a create session response to the SGW, wherein the create session response includes a UE Internet Protocol (IP) address and bearer context information. A fourth step can involve the SGW forwarding the create session response, which contains the UE IP address and bearer context information, to the MME. A fifth step can involve the MME sending an S1-MME message (e.g., an initial context setup request) to the eNB, wherein the S1-MME message includes the EPS Bearer Group ID. By including the EPS Bearer Group ID in the S1-MME message (e.g., the initial context setup request), the eNB can know how to group the corresponding EPS bearer over the S1 reference point.

In one example, the group-based S1 and S5/S8 bearers can be established once for the first EPS bearer/UE of the group. For the following EPS bearers/UEs in the same group, the S1 bearer establishment steps can be skipped, and the S5/S8 bearer establishment steps can be simplified by removing tunnel endpoint Identifier (TEID) information. In addition, the MME can track how many active UEs are connected for each EPS bearer group. The MME may not initiate the S1 or S5/8 bearer release procedure until the last EPS bearer/UE in the group is disconnected.

Figure 2:
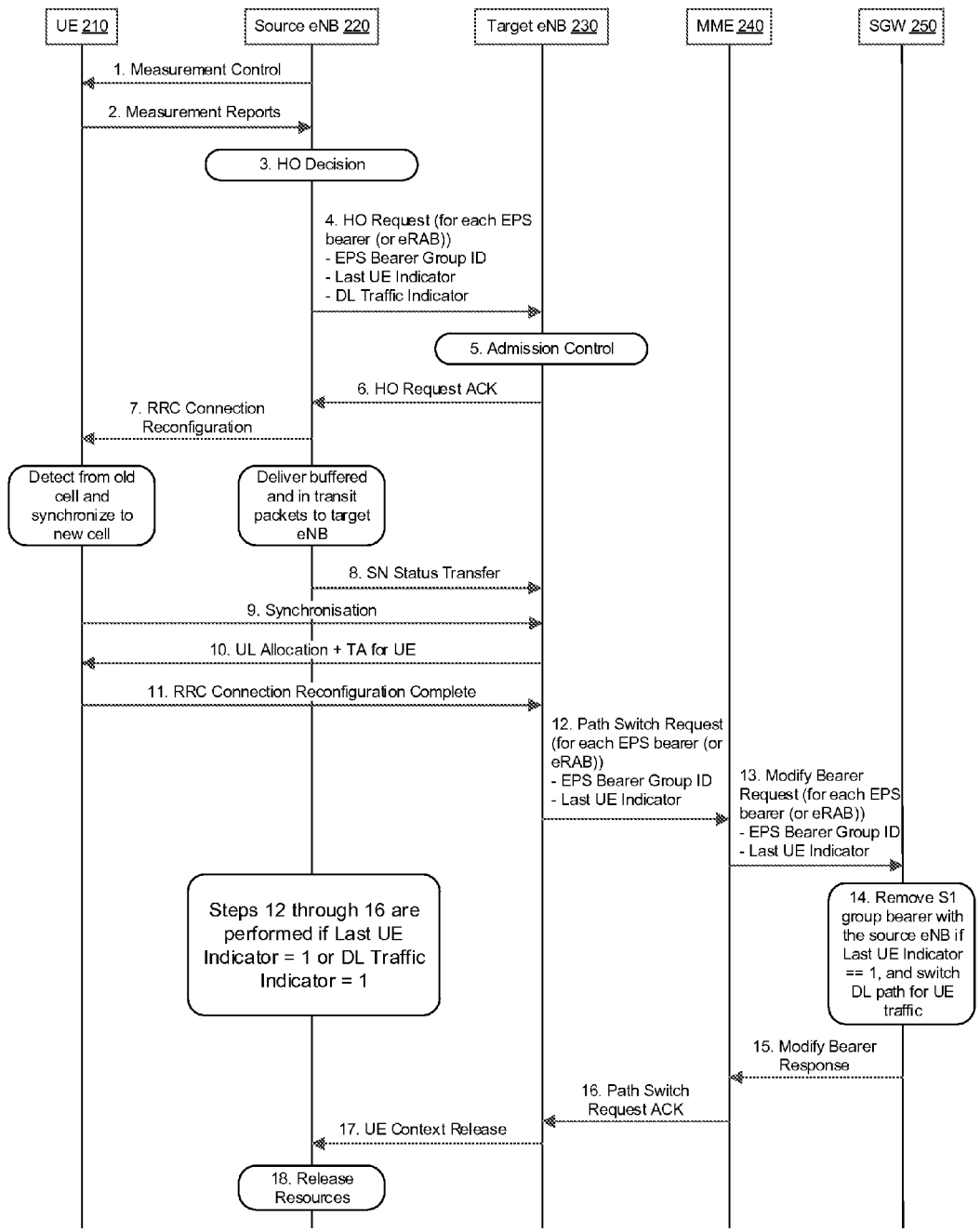
FIG. 2 illustrates a handover procedure with a group based evolved packet system (EPS) bearer in accordance with an example.

FIG. 2 illustrates an exemplary handover procedure with a group based evolved packet system (EPS) bearer. The handover procedure can be a result of a user equipment (UE) 210 moving from a source evolved node B (eNB) 220 to a target eNB 230. In other words, the UE 210 can initially be in proximity to the source eNB 220, but then the UE 210 can move closer to the target eNB 230, thereby triggering the handover procedure. In previous solutions, UEs have individual bearers (i.e., a bearer that is specific to the UE), so the entire bearer can be moved from the source eNB to the target eNB. However, when the UE uses a group EPS bearer, the group EPS bearer cannot be moved because other UEs that are still attached to the source eNB can be using the group EPS bearer. Therefore, the traditional handover procedure can be modified when group EPS bearers are being used.

The handover procedure between the source eNB 220 and the target eNB 230 can be further described in 3GPP Technical Specification (TS) 36.300 Release 11. At step 1, the source eNB 220 can configure UE measurement procedures according to area restriction information. The source eNB 220 can communicate measurements to the UE 210 that assist the function controlling the UE's connection mobility. At step 2, the UE 210 can communicate a measurement report to the source eNB 220. At step 3, the source eNB 220 can make a handover decision (i.e., the source eNB 220 can decide to hand the UE 210 to the target eNB 230) based on the measurement report and Radio Resource Management (RRM) information.

At step 4, the source eNB 220 can communicate a handover request message to the target eNB 230. The handover request message can include the necessary information to prepare for the handover at the target side, such as E-UTRAN Radio Access Bearer (E-RAB) quality of service (QoS) information.

In one example, the handover request message can include an evolved packet system (EPS) bearer group identifier (ID) indicating an EPS group bearer associated with the UE 210. The EPS bearer group ID can identify which EPS bearer group the UE 210 belongs to. The EPS group bearer that is identified using the EPS bearer group ID can be associated with a group of UEs, which includes the UE 210 being handed over from the source eNB 220 to the target eNB 230. The EPS group bearer can include a group-based S1 or S5/S8 bearer. The EPS group bearer ID can be created when the EPS group bearer is established. As previously explained, the EPS group bearer can be for the group of UEs, as opposed to individual EPS bearers being assigned to individual UEs in prior solutions.

In one example, the handover request message can include a last UE indicator that indicates whether the UE 210 is a last UE of the source eNB 220 to use the EPS group bearer. In other words, the last UE indicator can indicate that no other UEs are using the EPS group bearer with respect to the source eNB 220. The last UE indicator can be a binary field to indicate if a UE subject to handover is the last UE in the source eNB 220 for the corresponding EPS bearer. In one example, the last UE indicator can be represented as "0" when the UE 210 is not the last UE of the source eNB 220 to use the EPS bearer, and the last UE indicator can be represented as "1" when the UE 210 is the last UE of the source eNB 220 to use the EPS bearer.

In traditional solutions, there is one EPS bearer per UE, so when a UE moves from the source eNB 220 to the target eNB 230, the S1 EPS bearer for the UE that provides connectivity between the source eNB 220 and the SGW 250 must be removed. However, when the group-based S1 bearer is used by multiple UEs, if the UE 210 moves from the source eNB 220 to the target eNB 230, but the UE 210 is not the last UE that is using the group-based S1 bearer, then the group-based S1 bearer can be maintained to still provide connectivity for other UEs between the source eNB 220 and the SGW 250. The group-based S1 bearer can be maintained until the UE 210 is the last UE with respect to the source eNB 220. When the last UE moves from the source eNB 220 to the target eNB 230 (i.e., there are no more UEs that are using the EPS group bearer with respect to the source eNB 220), only then can the group-based S1 bearer can be removed.

In one example, the handover request message can include a downlink (DL) traffic indicator indicating DL traffic for the EPS group bearer. The DL traffic indicator is a binary field that can indicate whether the EPS group bearer has minimal or no downlink traffic. In general, a majority of machine type communications produces uplink traffic (e.g., meters collecting information), as opposed to downlink traffic. So the DL traffic during the handover can be negligible in some situations. In one example, the DL traffic indicator can be represented as "0" when the DL traffic indicator indicates that the DL traffic for the EPS group bearer of the UE during handover is below a defined threshold (e.g., the DL traffic during handover is negligible), and the DL traffic indicator can be represented as "1" when the DL traffic indicator indicates that the DL traffic for the EPS group bearer of the UE is above the defined threshold during handover (e.g., the DL traffic during handover is not negligible).

In one example, the EPS bearer group ID, the last UE indicator and the DL traffic indicator can be included in novel EPS bearer context information for each EPS bearer or extended ratio access bearer (eRAB) in handover messages. The EPS bearer group ID and the DL traffic indicator can be configured by a mobility management entity (MME) 210 during a bearer establishment procedure, and included as part of the UE's bearer context information. In addition, the last UE indicator can be determined by the source eNB 220 and included as part of the UE's bearer context information.

Returning to FIG. 2, at step 5, admission control can be performed by the target eNB 230 dependent on the received E-RAB QoS information to increase a likelihood of a successful handover, if the resources can be granted by the target eNB 230. The E-RAB can uniquely identify the concatenation of an S1 Bearer and the corresponding data radio bearer. The target eNB 230 can configure the required resources according to the received E-RAB QoS information and reserve a cell radio network temporary identifier (C-RNTI) and optionally a Random Access Channel (RACH) preamble.

At step 6, the target eNB 230 can prepare for handover with a physical layer (i.e., Layer 1, or L1) and a data link layer (i.e., Layer 2, or L2). The target eNB 230 can communicate a handover request acknowledge message to the source eNB 220. The handover request acknowledge message can include a transparent container to be sent to the UE 210 as an RRC message to perform the handover. The container may include a new C-RNTI, target eNB security algorithm identifiers, a dedicated RACH preamble, and other parameters (e.g., a system information block). As soon as the source eNB 220 receives the handover request acknowledge message from the target eNB 230, or as soon as the transmission of the handover command is initiated in the downlink, data forwarding can be initiated.

At step 7, the target eNB 230 can generate the RRC message to perform the handover, which can be communicated to the source eNB 220. The source eNB 220 can communicate the RRC message to the UE 210. In particular, the RRC message can be a RRC Connection Reconfiguration message that includes mobility control information. The source eNB 220 can perform the necessary integrity protection and ciphering of the RRC message. The UE 210 can receive the RRC Connection Reconfiguration message with the necessary parameters (e.g., a new C-RNTI, target eNB security algorithm identifiers, and optionally dedicated RACH preamble). The UE 210 can be instructed by the source eNB 220 to perform the handover. In other words, the UE 210 can be instructed to detach from the source eNB 220 and synchronize to the target eNB 230 (i.e., the new source eNB).

At step 8, the source eNB 220 can communicate a sequence number (SN) status transfer message to the target eNB 230. The SN status transfer message can convey the uplink packet data convergence protocol (PDCP) SN receiver status and the downlink PDCP SN transmitter status of E-RABs for which PDCP status preservation applies (i.e., for radio link control acknowledged mode, or RLC AM).

At step 9, after receiving the RRC Connection Reconfiguration message that includes the mobility control information, the UE 210 can perform synchronization with the target eNB 230 and then access a target cell via a random access channel (RACH). The UE 210 can access the target cell following a contention-free procedure if a dedicated RACH preamble was indicated in the mobility control information. Alternatively, the UE 210 can access the target cell following a contention-based procedure if no dedicated preamble was indicated in the mobility control information.

At step 10, the target eNB 230 can respond to the UE 210 with uplink (UL) allocation and timing advance. At step 11, when the UE 210 has successfully accessed the target cell, the UE 210 can communicate the RRC Connection Reconfiguration Complete message (including a C-RNTI) to the target eNB 230 to confirm the handover. The RRC Connection Reconfiguration Complete message can include an uplink Buffer Status Report to indicate that the handover procedure is completed for the UE 210. The target eNB 230 can verify the C-RNTI included in the RRC Connection Reconfiguration Complete message. After step 11 occurs, the target eNB 230 can begin communicating user data to the UE 210.

In one configuration, the handover procedure can include steps 12 through 16 when the UE 210 is the last UE (i.e., Last UE indicator=1) in the EPS bearer group with the source eNB 220 or the DL traffic is not negligible (i.e., DL Traffic Indicator=1). The DL traffic can be non-negligible when the level of DL traffic is above the defined threshold. Since the UE 210 is the last UE, steps 12 through 16 are to be performed in order to inform the SGW 250 that the corresponding group-based S1 bearer with the source eNB 220 should be torn down. In addition, steps 12 through 16 are to be performed in order to inform the SGW 250 that a DL path should be switched for the UE's traffic since the DL traffic is non-negligible.

At step 12, the target eNB 230 can send a path switch request message to the MME 240 to inform the UE 240 that the UE 210 has changed cells. The path switch request message can be for each EPS group bearer (or E-RAB) with the source eNB 220. The path switch request message can include the EPS bearer group ID and the last UE indicator.

At step 13, the MME 240 can send a modify bearer request message to the SGW 250. The modify bearer request message can be for each EPS group bearer (or E-RAB) with the source eNB 220. The modify bearer request message can include the EPS bearer group ID and the last UE indicator.

At step 14, the SGW 250 can switch the downlink data path to the target side. The SGW 250 can send one or more "end marker" packets on the old path to the source eNB 220, and then can release U-plane and/or transport network layer (TNL) resources towards the source eNB 220. At step 14, the SGW 250 can remove the S1 group bearer with the source eNB 220 since the UE 210 is the last UE in the EPS bearer group with the source eNB 220. In other words, since the UE 210 is the last UE in the EPS bearer group, the EPS bearer group does not need to be further maintained at the source eNB 220. In addition, the SGW 250 can switch the downlink data path for the UE's traffic since the DL traffic is non-negligible, and therefore, the UE 210 is to continue to receive downlink traffic after switching to the target eNB 230.

At step 15, the SGW 250 can send a modify bearer response message to the MME 240. At step 16, the MME 240 can confirm the path switch request message with a path switch request acknowledgement message, which is communicated from the MME 240 to the target eNB 230. At step 17, the target eNB 230 can send a UE context release message to the source eNB 220. By sending the UE context release message, the target eNB 230 can inform the source eNB 220 of a successful handover and trigger the release of resources by the source eNB 220. The target eNB 230 can send the UE context release message after the path switch request acknowledgement message is received from the MME 240. At step 18, upon reception of the UE context release message, the source eNB 220 can release radio and C-plane related resources associated to the UE context.

In one configuration, when the UE 210 is to be handover over from the source eNB 220 to the target eNB 230, the target eNB 230 can determine whether the EPS group bearer associated with the UE 210 is already established at the target eNB 230. In other words, the target eNB 230 can determine whether other UEs are already using the same EPS group bearer. If the EPS group bearer is already established at the target eNB 230, then reestablishment of the EPS group bearer is unnecessary, thereby saving signaling resources. If the EPS group bearer is not presently established at the target eNB 230 (i.e., the UE 210 is the first UE to use the EPS group bearer with respect to the target eNB 230), then the target eNB 230 can establish the EPS group bearer. However, the target eNB 230 does not have to reestablish the EPS group bearer for subsequent UEs that are being handed over to the target eNB 230, wherein the subsequent UEs are associated with the same EPS bearer group ID as the UE 210.

Figure 3:
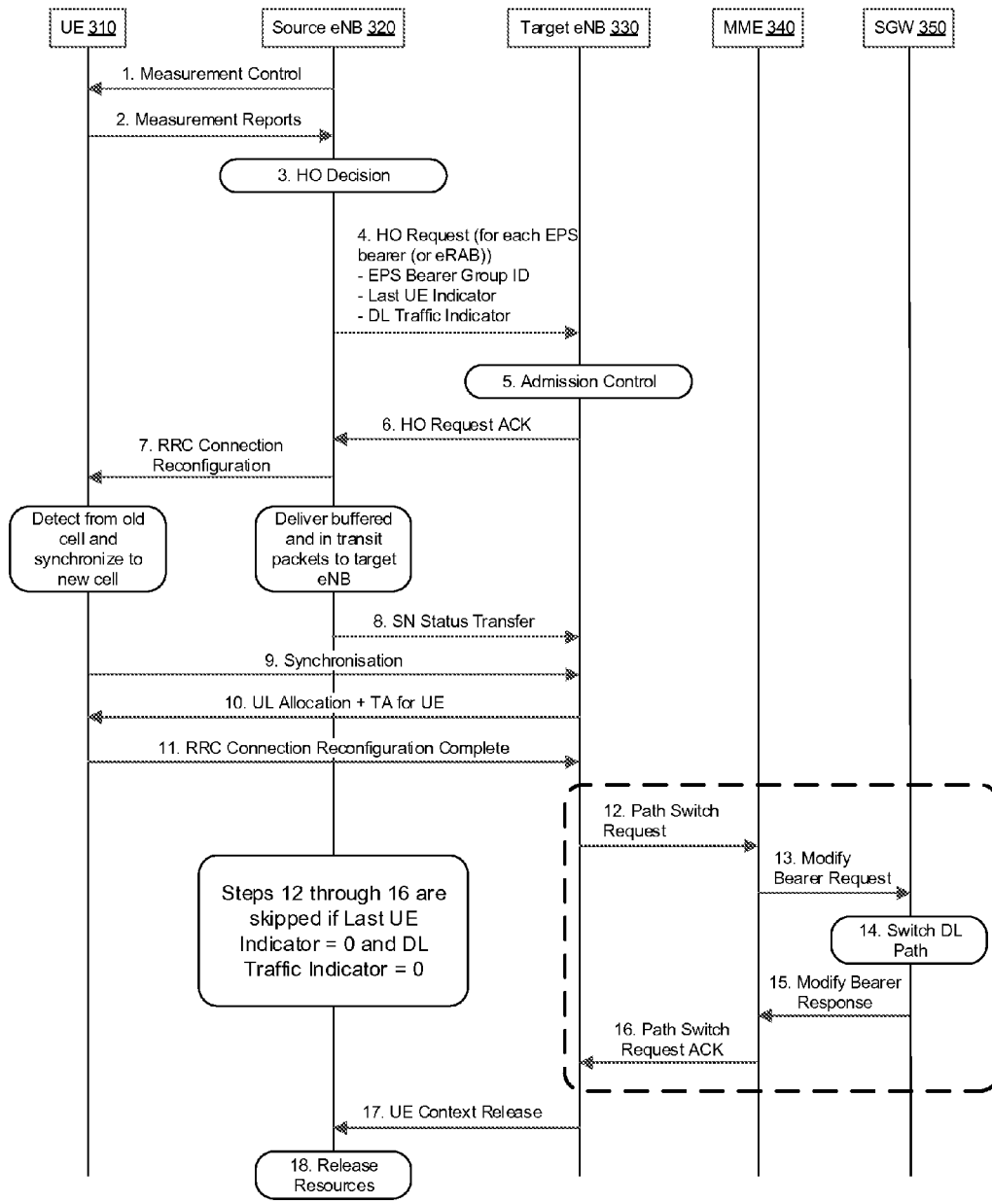
FIG. 3 illustrates a handover procedure with a group based evolved packet system (EPS) bearer in accordance with an example.

FIG. 3 illustrates an exemplary handover procedure with a group based evolved packet system (EPS) bearer. The handover procedure can be a result of a user equipment (UE) 310 moving from a source evolved node B (eNB) 320 to a target eNB 330. In other words, the UE 310 can initially be in proximity to the source eNB 320, but then the UE 310 can move closer to the target eNB 330, thereby triggering the handover procedure. The traditional handover procedure can be modified when group EPS bearers are being used.

The handover procedure between the source eNB 320 and the target eNB 330 can be further described in 3GPP Technical Specification (TS) 36.300 Release 11. At step 1, the source eNB 320 can communicate measurements to the UE 310 that assist a function controlling the UE's connection mobility. At step 2, the UE 310 can communicate a measurement report to the source eNB 320. At step 3, the source eNB 320 can make a handover decision (i.e., the source eNB 320 can decide to hand the UE 310 to the target eNB 330) based on the measurement report and Radio Resource Management (RRM) information.

At step 4, the source eNB 320 can communicate a handover request message to the target eNB 330. The handover request message can include an evolved packet system (EPS) bearer group identifier (ID), a last UE indicator and a downlink (DL) traffic indicator, as previously described.

At step 5, admission control can be performed by the target eNB 330. At step 6, the target eNB 330 can communicate a handover request acknowledge message to the source eNB 320. At step 7, the target eNB 330 can generate a radio resource control (RRC) message to perform the handover, which can be communicated to the source eNB 320. The source eNB 320 can communicate the RRC message, such as an RRC Connection Reconfiguration message, to the UE 310. The UE 310 can be instructed by the source eNB 320 to perform the handover upon receiving the RRC Connection Reconfiguration message. In other words, the UE 310 can be instructed to detach from the source eNB 320 and synchronize to the target eNB 330 (i.e., the new source eNB).

At step 8, the source eNB 320 can communicate a sequence number (SN) status transfer message to the target eNB 330. At step 9, the UE 310 can perform synchronization with the target eNB 330. At step 10, the target eNB 330 can respond to the UE 310 with uplink (UL) allocation and timing advance. At step 11, the UE 310 can communicate an RRC Connection Reconfiguration Complete message to the target eNB 330 to confirm the handover. After step 11 occurs, the target eNB 330 can begin communicating user data to the UE 310.

In one configuration, the handover procedure can skip steps 12 through 16 when the UE 310 is not the last UE (i.e., Last UE indicator=0) in the EPS bearer group with the source eNB 320 and the DL traffic is negligible (i.e., DL Traffic Indicator=0). The DL traffic can be negligible when the level of DL traffic is below the defined threshold. Since the UE 210 is not the last UE, steps 12 through 16 can be skipped because the SGW 350 does not have to tear down the corresponding group-based S1 bearer with the source eNB 320. In other words, the group-based S1 bearer, or EPS group bearer, is not to be torn down because it is being used by other UEs with respect to the source eNB 320. The handover procedure can include informing the target eNB 330 of the S1-U tunnel parameters of the SGW 350, but if the S1 bearer is already established for the same EPS group bearer at the target eNB 330, then the target eNB 330 should already have the S1-U tunnel parameters. One example of an S1-U tunnel parameter is a General Packet Radio Service (GPRS) Tunneling Protocol (GTP) tunnel endpoint Identifier (TEID). Therefore, steps 12 through 16 of the traditional handover procedure can be skipped. In addition, steps 12 through 16 can be skipped because a DL path for the UE's traffic is not to be switched by the SGW 350 since the DL traffic is negligible. Instead, step 14 for switching the DL path can be triggered inexplicitly by first uplink packets that arrive from the target eNB 330. In other words, the SGW 350 can switch the DL path from the source eNB 320 to the target eNB 330 for the UE's traffic after receiving the first uplink packets.

Since the handover procedure can skip steps 12 through 16 when the UE 310 is not the last UE (i.e., Last UE indicator=0) in the EPS bearer group with the source eNB 320 and the DL traffic is negligible (i.e., DL Traffic Indicator=0), the handover procedure can continue with step 17. At step 17, the target eNB 330 can send a UE context release message to the source eNB 320. At step 18, upon reception of the UE context release message, the source eNB 320 can release radio and C-plane related resources associated to the UE context.

Figure 4:
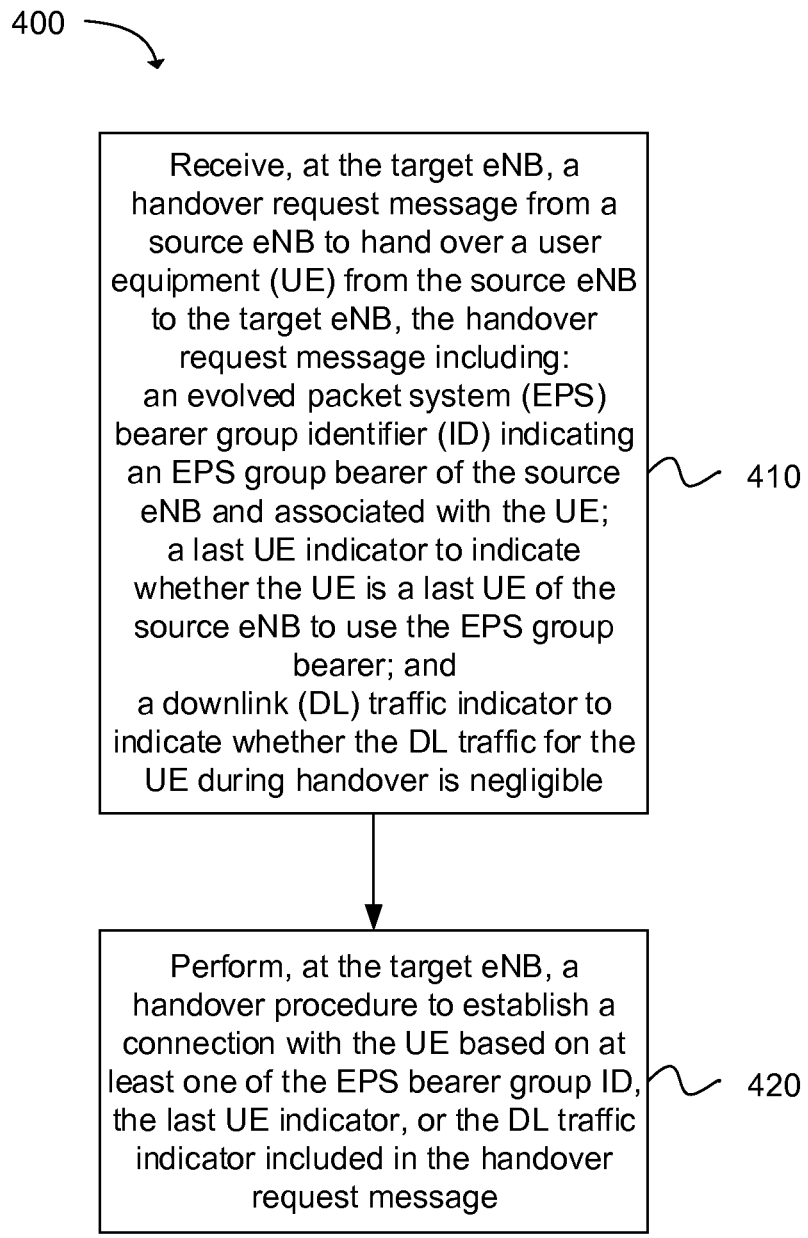
FIG. 4 depicts functionality of a target evolved node B (eNB) operable to facilitate handover in accordance with an example.

Another example provides functionality 400 of a target evolved node B (eNB) operable to facilitate handover, as shown in the flow chart in FIG. 4. The functionality can be implemented as a method or the functionality can be executed as instructions on a machine, where the instructions are included on at least one computer readable medium or one non-transitory machine readable storage medium. The target eNB can include one or more processors configured to receive, at the target eNB, a handover request message from a source eNB to hand over a user equipment (UE) from the source eNB to the target eNB, the handover request message including: an evolved packet system (EPS) bearer group identifier (ID) indicating an EPS group bearer of the source eNB and associated with the UE; a last UE indicator to indicate whether the UE is a last UE of the source eNB to use the EPS group bearer; and a downlink (DL) traffic indicator to indicate whether the DL traffic for the UE during handover is negligible, as in block 410. The target eNB can include one or more processors configured to perform a handover procedure to establish a connection with the UE based on at least one of the EPS bearer group ID, the last UE indicator, or the DL traffic indicator included in the handover request message, as in block 420.

In one example, the one or more processors can be further configured to: determine that the last UE indicator indicates that the UE is the last UE of the source eNB to use the EPS group bearer; determine that the DL traffic indicator indicates that the DL traffic for the UE during handover is not negligible; and perform, at the target eNB, the handover procedure to establish the connection with the UE, wherein the handover procedure includes removal of the EPS group bearer with the source eNB and switching a DL path for UE traffic when the UE is the last UE and the DL traffic is not negligible. In another example, the handover procedure includes sending a path switch request message from the target eNB to a mobility management entity (MME) when at least one of the following occurs: the UE is the last UE or the DL traffic is not negligible.

In one example, the one or more processors are further configured to: determine that the last UE indicator indicates that the UE is not the last UE of the source eNB to use the EPS group bearer; determine that the DL traffic indicator indicates that the DL traffic for the UE during handover is negligible; and perform, at the target eNB, the handover procedure to establish the connection with the UE, wherein the handover procedure does not include removal of the EPS group bearer with the source eNB and switching a DL path for the UE traffic when the UE is not the last UE and the DL traffic is negligible.

In one example, the one or more processors are further configured to: determine that the EPS group bearer associated with the UE is not currently established at the target eNB; and perform a bearer establishment procedure to establish the EPS group bearer at the target eNB. In another example, the EPS group bearer is an S1 group bearer or an S5/S8 group bearer. In yet another example, the EPS group bearer is shared by a plurality of UEs.

In one example, the one or more processors are configured to facilitate handover of the UE that is configured to perform machine type communications. In another example, the EPS bearer group ID and the DL traffic indicator included in the handover request message are configured at a mobility management entity (MME). In yet another example, the last UE indicator included in the handover request message is determined at the source eNB.

Figure 5:
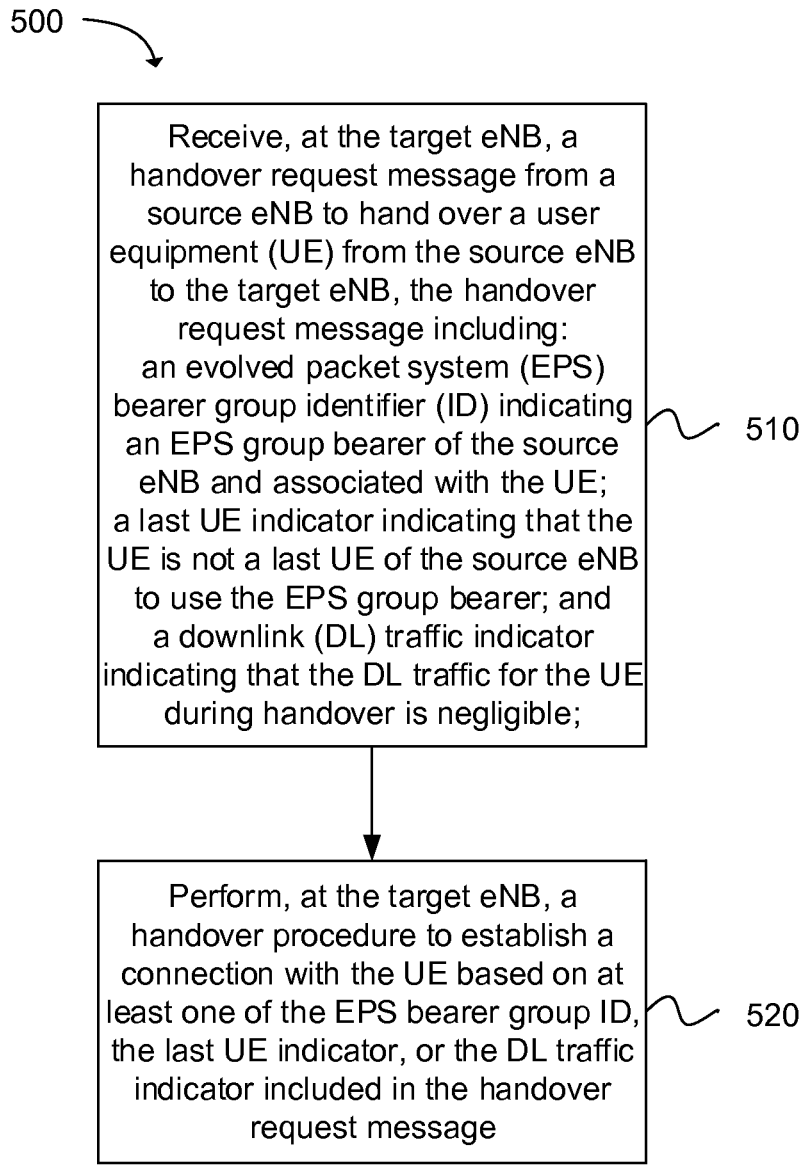
FIG. 5 depicts functionality of a target evolved node B (eNB) operable to facilitate handover in accordance with an example.

Another example provides functionality 500 of a target evolved node B (eNB) operable to facilitate handover, as shown in the flow chart in FIG. 5. The functionality can be implemented as a method or the functionality can be executed as instructions on a machine, where the instructions are included on at least one computer readable medium or one non-transitory machine readable storage medium. The target eNB can include one or more processors configured to receive, at the target eNB, a handover request message from a source eNB to hand over a user equipment (UE) from the source eNB to the target eNB, the handover request message including: an evolved packet system (EPS) bearer group identifier (ID) indicating an EPS group bearer of the source eNB and associated with the UE; a last UE indicator indicating that the UE is not a last UE of the source eNB to use the EPS group bearer; and a downlink (DL) traffic indicator indicating that the DL traffic for the UE during handover is negligible, as in block 510. The target eNB can include one or more processors configured to perform a handover procedure to establish a connection with the UE, wherein the handover procedure does not include removal of the EPS group bearer with the source eNB or switching a DL path for the UE traffic when the UE is not the last UE and the DL traffic is negligible, as in block 520.

In one example, the one or more processors are further configured to: determine that the EPS group bearer associated with the UE is not currently established at the target eNB; and perform a bearer establishment procedure to establish the EPS group bearer at the target eNB. In another example, the EPS group bearer is an S1 group bearer or an S5/S8 group bearer. In yet another example, the EPS group bearer is shared by a plurality of UEs.

In one example, the one or more processors are configured to facilitate handover of the UE that is configured to perform machine type communications. In another example, the EPS bearer group ID and the DL traffic indicator included in the handover request message are configured at a mobility management entity (MME). In yet another example, the last UE indicator included in the handover request message is determined at the source eNB.

Figure 6:
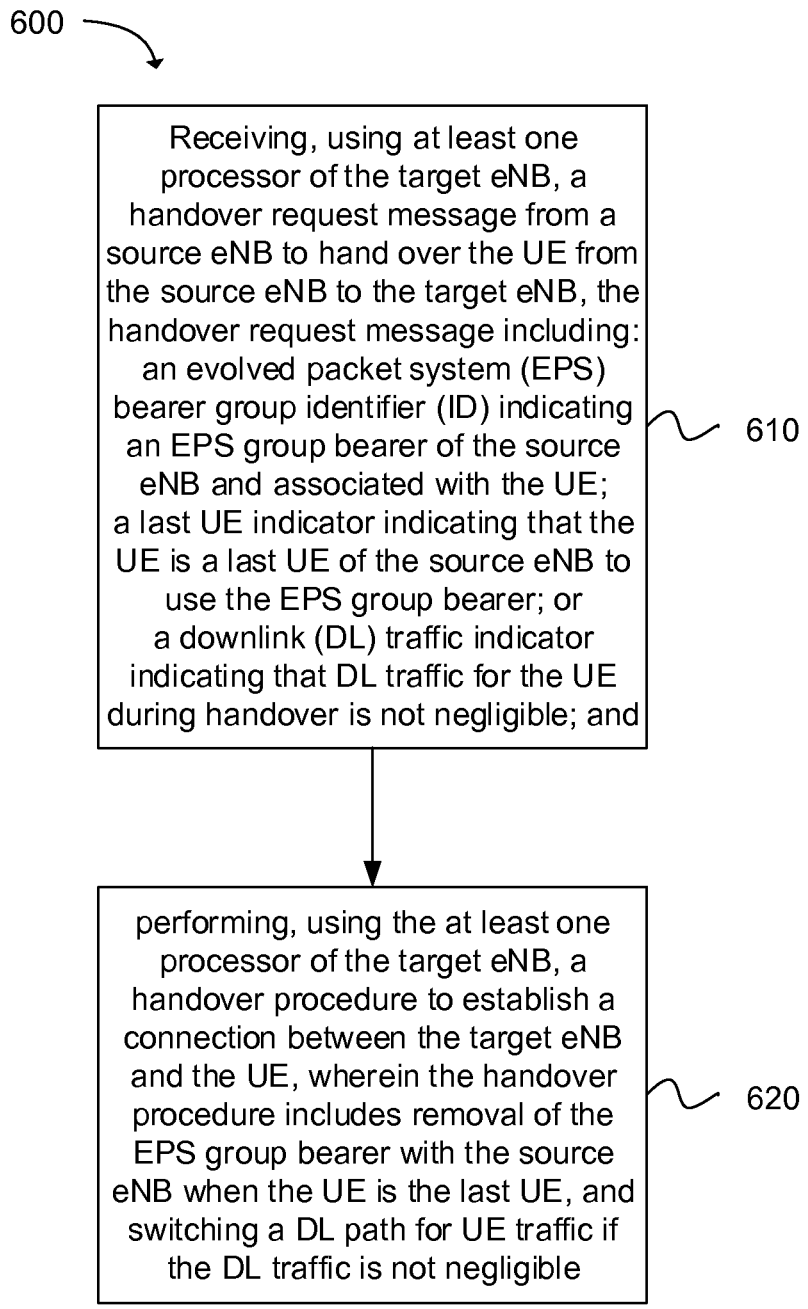
FIG. 6 depicts a flowchart of a non-transitory machine readable storage medium having instructions embodied thereon for facilitating handover at a target evolved node B (eNB) for a user equipment (UE) in accordance with an example.

Another example provides at least one non-transitory machine readable storage medium having instructions 600 embodied thereon for facilitating handover at a target evolved node B (eNB) for a user equipment (UE), as shown in the flow chart in FIG. 6. The instructions when executed perform the following: receiving, using at least one processor of the target eNB, a handover request message from a source eNB to hand over the UE from the source eNB to the target eNB, as in block 610. The handover request message can include an evolved packet system (EPS) bearer group identifier (ID) indicating an EPS group bearer of the source eNB and associated with the UE; a last UE indicator indicating that the UE is a last UE of the source eNB to use the EPS group bearer; or a downlink (DL) traffic indicator indicating that DL traffic for the UE during handover is not negligible. The instructions when executed perform the following: performing, using the at least one processor of the target eNB, a handover procedure to establish a connection between the target eNB and the UE, wherein the handover procedure includes removal of the EPS group bearer with the source eNB when the UE is the last UE, and switching a DL path for UE traffic if the DL traffic is not negligible, as in block 620.

In one example, the at least one non-transitory machine readable storage medium can further comprise instructions, which when executed by the at least one processor of the target eNB, performs the following: sending a path switch request message from the target eNB to a mobility management entity (MME), the path switch request message including the EPS bearer group ID and the last UE indicator. In another example, the at least one non-transitory machine readable storage medium can further comprise instructions, which when executed by the at least one processor of the target eNB, performs the following: sending, from the target eNB to a mobility management entity (MME), a path switch request message that includes the EPS bearer group ID and the last UE indicator, wherein the MME is configured to send a modified bearer request message that includes the EPS bearer group ID and the last UE indicator to a serving gateway (SGW). In yet another example, the removal of the EPS group bearer with the source eNB and switching the DL path for UE traffic is performed at a serving gateway (SGW).

Figure 7:
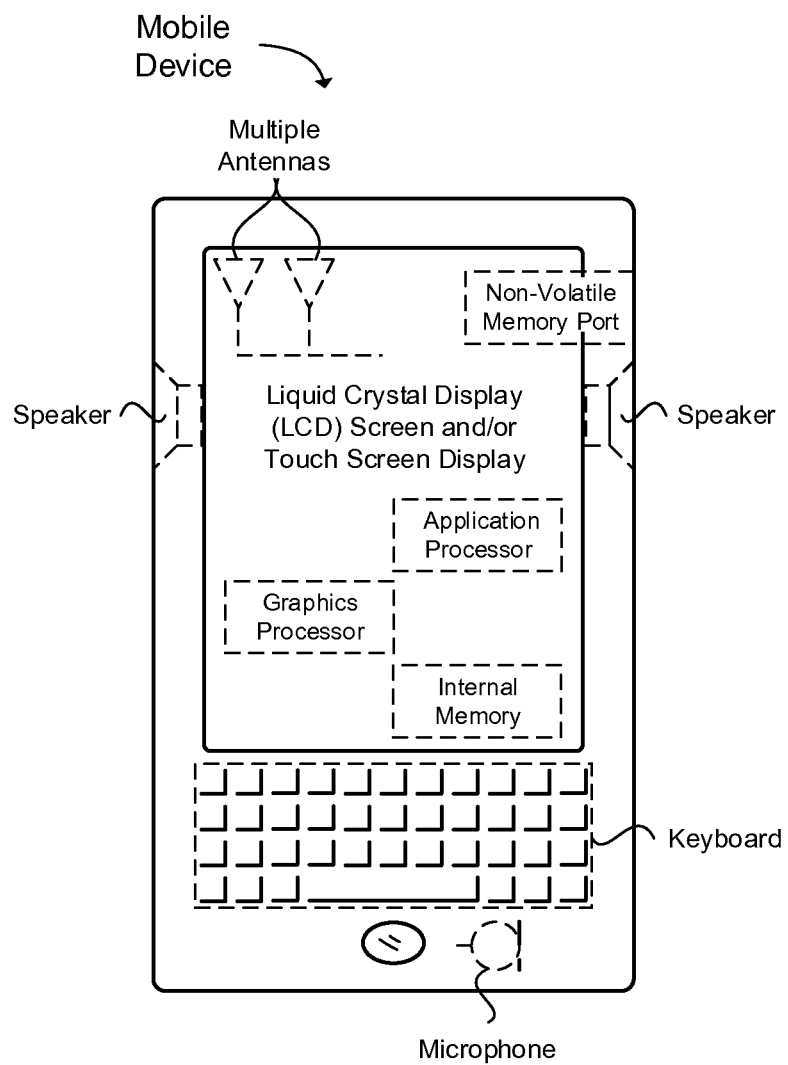
FIG. 7 illustrates a diagram of a wireless device (e.g., UE) in accordance with an example.

FIG. 7 provides an example illustration of the wireless device, such as an user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 7 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

Various techniques, or certain aspects or portions thereof, can take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a RAM, EPROM, flash drive, optical drive, magnetic hard drive, solid state drive, or other medium for storing electronic data. The node and wireless device can also include a transceiver module, a counter module, a processing module, and/or a clock module or timer module. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits or multiple processors can be used to implement the functional units described in this specification. For example, a first hardware circuit or a first processor can be used to perform processing operations and a second hardware circuit or a second processor (e.g., a transceiver or a baseband processor) can be used to communicate with other entities. The first hardware circuit and the second hardware circuit can be integrated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A target evolved node B (eNB) configured to facilitate handover, the target eNB comprising one or more processors; and a memory communicatively coupled to the at least one or more processors wherein the at least one or more processors configured to:
   receive, at the target eNB, a handover request message from a source eNB to hand over a user equipment (UE) from the source eNB to the target eNB, the handover request message including:
      an evolved packet system (EPS) bearer group identifier (ID) indicating an EPS group bearer of the source eNB and associated with the UE;
      a last UE indicator to indicate whether the UE is a last UE of the source eNB to use the EPS group bearer; and
      a downlink (DL) traffic indicator to indicate whether the DL traffic for the UE during handover is negligible; and
   perform, at the target eNB, a handover procedure to establish a connection with the UE based on at least one of the EPS bearer group ID, the last UE indicator, or the DL traffic indicator included in the handover request message.

2. The target eNB of claim 1, wherein the one or more processors are further configured to:
   determine that the last UE indicator indicates that the UE is the last UE of the source eNB to use the EPS group bearer;
   determine that the DL traffic indicator indicates that the DL traffic for the UE during handover is not negligible; and
   perform, at the target eNB, the handover procedure to establish the connection with the UE, wherein the handover procedure includes removal of the EPS group bearer with the source eNB and switching a DL path for UE traffic when the UE is the last UE and the DL traffic is not negligible.

3. The target eNB of claim 2, wherein the handover procedure includes sending a path switch request message from the target eNB to a mobility management entity (MIME) when at least one of the following occurs: the UE is the last UE or the DL traffic is not negligible.

4. The target eNB of claim 1, wherein the one or more processors are further configured to:

determine that the last UE indicator indicates that the UE is not the last UE of the source eNB to use the EPS group bearer;
determine that the DL traffic indicator indicates that the DL traffic for the UE during handover is negligible; and
perform, at the target eNB, the handover procedure to establish the connection with the UE, wherein the handover procedure does not include removal of the EPS group bearer with the source eNB and switching a DL path for the UE traffic when the UE is not the last UE and the DL traffic is negligible.

5. The target eNB of claim 1, wherein the one or more processors are further configured to:
determine that the EPS group bearer associated with the UE is not currently established at the target eNB; and
perform a bearer establishment procedure to establish the EPS group bearer at the target eNB.

6. The target eNB of claim 1, wherein the EPS group bearer is an S1 group bearer or an S5/S8 group bearer at the target eNB.

7. The target eNB of claim 1, wherein the EPS group bearer is shared by a plurality of UEs.

8. The target eNB of claim 1, wherein the one or more processors are configured to facilitate handover of the UE that is configured to perform machine type communications.

9. The target eNB of claim 1, wherein the EPS bearer group ID and the DL traffic indicator included in the handover request message are configured at a mobility management entity (MME).

10. The target eNB of claim 1, wherein the last UE indicator included in the handover request message is determined at the source eNB.

11. A target evolved node B (eNB) configured to facilitate handover, the target eNB comprising one or more processors; and a memory communicatively coupled to the at least one or more processors wherein the at least one or more processors configured to:
receive, at the target eNB, a handover request message from a source eNB to hand over a user equipment (UE) from the source eNB to the target eNB, the handover request message including:
an evolved packet system (EPS) bearer group identifier (ID) indicating an EPS group bearer of the source eNB and associated with the UE;
a last UE indicator indicating that the UE is not a last UE of the source eNB to use the EPS group bearer; and
a downlink (DL) traffic indicator indicating that the DL traffic for the UE during handover is negligible; and
perform, at the target eNB, a handover procedure to establish a connection with the UE, wherein the handover procedure does not include removal of the EPS group bearer with the source eNB or switching a DL path for the UE traffic when the UE is not the last UE and the DL traffic is negligible.

12. The target eNB of claim 11, wherein the one or more processors are further configured to:
determine that the EPS group bearer associated with the UE is not currently established at the target eNB; and
perform a bearer establishment procedure to establish the EPS group bearer at the target eNB.

13. The target eNB of claim 11, wherein the EPS group bearer is an S1 group bearer or an S5/S8 group bearer at the target eNB.

14. The target eNB of claim 11, wherein the EPS group bearer is shared by a plurality of UEs.

15. The target eNB of claim 11, wherein the one or more processors are configured to facilitate handover of the UE that is configured to perform machine type communications.

16. The target eNB of claim 11, wherein the EPS bearer group ID and the DL traffic indicator included in the handover request message are configured at a mobility management entity (MME).

17. The target eNB of claim 11, wherein the last UE indicator included in the handover request message is determined at the source eNB.

18. At least one non-transitory machine readable storage medium having instructions embodied thereon for facilitating handover at a target evolved node B (eNB) for a user equipment (UE), the instructions when executed perform the following:
receiving, using at least one processor of the target eNB, a handover request message from a source eNB to hand over the UE from the source eNB to the target eNB, the handover request message including:
an evolved packet system (EPS) bearer group identifier (ID) indicating an EPS group bearer of the source eNB and associated with the UE;
a last UE indicator indicating that the UE is a last UE of the source eNB to use the EPS group bearer; or
a downlink (DL) traffic indicator indicating that DL traffic for the UE during handover is not negligible; and
performing, using the at least one processor of the target eNB, a handover procedure to establish a connection between the target eNB and the UE, wherein the handover procedure includes removal of the EPS group bearer with the source eNB when the UE is the last UE, and switching a DL path for UE traffic if the DL traffic is not negligible.

19. The at least one non-transitory machine readable storage medium of claim 18, further comprising instructions which when executed by the at least one processor of the target eNB performs the following:
sending a path switch request message from the target eNB to a mobility management entity (MME), the path switch request message including the EPS bearer group ID and the last UE indicator.

20. The at least one non-transitory machine readable storage medium of claim 18, further comprising instructions which when executed by the at least one processor of the target eNB performs the following:
sending, from the target eNB to a mobility management entity (MME), a path switch request message that includes the EPS bearer group ID and the last UE indicator, wherein the MME is configured to send a modified bearer request message that includes the EPS bearer group ID and the last UE indicator to a serving gateway (SGW).

21. The at least one non-transitory machine readable storage medium of claim 18, wherein the removal of the EPS group bearer with the source eNB and switching the DL path for UE traffic is performed at a serving gateway (SGW).

* * * * *